S. T. HUTTON.
COMPRESSION TABLE AND SYSTEM OF OPERATION FOR THE SAME.
APPLICATION FILED JAN. 14, 1910.

1,074,120.

Patented Sept. 30, 1913.
5 SHEETS—SHEET 1.

Witnesses:
L. W. Novander
Frank J. Thelen

Inventor
Samuel T. Hutton
By Bruno William
Attorneys

S. T. HUTTON.
COMPRESSION TABLE AND SYSTEM OF OPERATION FOR THE SAME.
APPLICATION FILED JAN. 14, 1910.

1,074,120.  Patented Sept. 30, 1913.

Witnesses:  Inventor
Samuel T. Hutton
By
Attorneys

S. T. HUTTON.
COMPRESSION TABLE AND SYSTEM OF OPERATION FOR THE SAME.
APPLICATION FILED JAN. 14, 1910.

1,074,120.

Patented Sept. 30, 1913.

UNITED STATES PATENT OFFICE.

SAMUEL T. HUTTON, OF CHICAGO, ILLINOIS, ASSIGNOR TO SCHEIDEL WESTERN X-RAY COIL CO., OF CHICAGO, ILLINOIS, A CORPORATION OF ILLINOIS.

COMPRESSION-TABLE AND SYSTEM OF OPERATION FOR THE SAME.

1,074,120.      Specification of Letters Patent.    Patented Sept. 30, 1913.

Application filed January 14, 1910. Serial No. 538,113.

*To all whom it may concern:*

Be it known that I, SAMUEL T. HUTTON, a citizen of the United States, residing at Chicago, in the county of Cook and State of Illinois, have invented a certain new and Improved Compression-Table and System of Operation for the Same, of which the following is a full, clear, concise, and exact description, reference being had to the accompanying drawings, forming a part of this specification.

My invention relates to an improved form of compression table for X-ray working for the use of physicians and surgeons in making examinations and photographic plates to facilitate medical and surgical work. Tables furnished for this purpose heretofore have been equipped with supporting means for X-ray tubes, which means have been attached to opposite edges of the table. This construction has been found to be disadvantageous, in that the patient to be treated must necessarily be placed upon the table by moving him endwise thereon beneath the support for the X-ray tube.

By my invention I provide a construction in which the tube is supported by an overhanging construction from one edge of the table, as a result of which the patient may easily be placed upon the table sidewise from the opposite side thereof.

My invention further consists in pivoting the supporting means in such a manner that the arm used to support the X-ray tube and all of the parts carried thereby may be swung entirely clear of the table, if desired to facilitate placing the patient in the proper position upon the table or for the purpose of using the X-ray apparatus away from and at one side of the table. The means employed to support the X-ray tube over the table is so constructed that it may be adjusted readily to a position over any desired point of the table and in such position that a compression member located between the tube and the table may be brought firmly into contact with the patient.

My invention further consists in an improved form of compression member, by which the parts treated are held more positively against vibration than has been possible with the forms of compression member used heretofore. Means are provided for quickly and positively imparting to the X-ray tube and to the compression member the adjustments mentioned and for securely retaining the same in the position to which they are moved.

A further object of my invention is to construct a supporting means for the X-ray tube and compression member of such a nature that the tube and compression member may be freely swung upon their support so that the X-ray tube may occupy practically the same position relatively to the table when the supporting member is moved upon its pivot so as to bring the X-ray tube over different positions on the table.

A further object of my invention consists in equipping the supporting member with limiting stops or devices for definitely determining two positions of the X-ray tube and compression member and for so locating these parts relatively to the supporting member for the two positions that the axes of the rays projected from the tube through the compression member are directed at practically the same point on or near the top of the table.

My invention further consists in providing graduations upon the top of the table and similar graduations upon the means used to support the X-ray tube in order that the tube may be quickly and accurately brought over any desired point on the table without special measurement, and, furthermore, that the distance of the tube from the table may be quickly and accurately ascertained for any adjustment.

My invention also consists in providing the compression table with a second supporting means for supporting a second X-ray tube at one side of the table in such a position as to direct the rays horizontally above the table at any desired distance from it. A compression member is also associated with the second X-ray tube and thus photographic plates may be made either vertically or horizontally, as desired. This arrangement of my compression table is particularly adapted for using the so-called "O'Donnell method," consisting in directing a field from one X-ray source at practically right angles across a field from a second X-ray source, in order to neutralize the interceptive effect of normally opaque substances which lie in the field common to both sources, without, however, interfering with the penetrative effect of either set of rays as to portions of the body treated that are not traversed by both sets of rays in common.

My invention further provides a removable portion in the top of the table by which the patient may be treated while in a practically vertical position and photographic plates may be made either in an inclined or horizontal direction as desired by means of the first X-ray tube and compression member mentioned. In using this feature of my invention, the removable portion of the table top serves as a support for the patient and also as a support of the plate-holder containing the photographic plate.

My table is also adapted for use for the treatment known as autocondensation, in which the patient upon the table is caused to be one terminal or electrode of an alternating current source, while a conductor of large surface, as for example a sheet of metal, is placed in close proximity to, but insulated from, the patient and connected to the other electrode of such source.

My improved system of operating the apparatus referred to above consists in using a high frequency electrolytic interrupter in connection with an induction coil having a plurality of separate primary windings, which are connected in circuit as desired by means of a special switch for the purpose of securing any desired degree of excitation of the core of the induction coil, as a result of which the electromotive force produced by the secondary winding of the induction coil is varied as desired.

In connection with the use of two X-ray tubes for the purposes indicated, my system contemplates the use of a single electrolytic interrupter and a separate induction coil of the type referred to for each tube together with switching means for connecting the primary windings of either induction coil in circuit as desired and for connecting either one of the coils as desired or both of the coils in series with the leads connected with the source of electric energy. In carrying out my system, I further make use of a novel arrangement of connections to the secondary windings of the induction coils for the purpose of measuring the current flowing in the secondary windings. This consists in opening the secondary windings at practically their middle points and extending leads from the terminals of the windings thus produced to a milliammeter for each winding. In this way the current flowing through the secondary winding of either induction coil may be measured without subjecting the conductors extending from the secondary windings to the milliameter to an appreciable difference of potential from the other electrical conductors used.

The several drawings illustrating my invention are as follows.

Similar numerals refer to similar parts throughout the several views.

Figures 1, 4:
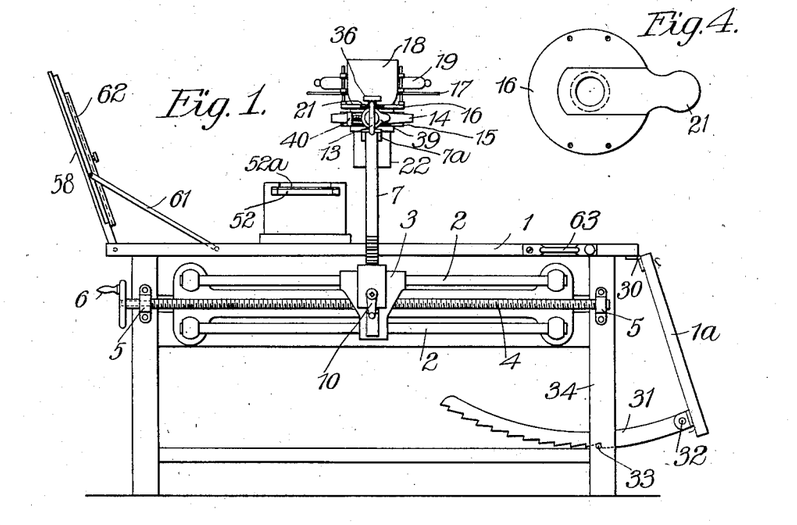
Figure 1 is a side view of my table complete, and in this arrangement the supporting means for the X-ray tube at the side of the table is shown diagrammatically.
Fig. 4 is a detail view of the diaphragm receptacle and a diaphragm in place therein used to restrict the field communicated from the X-ray tube to the subject to be treated.
Figures 2, 3:
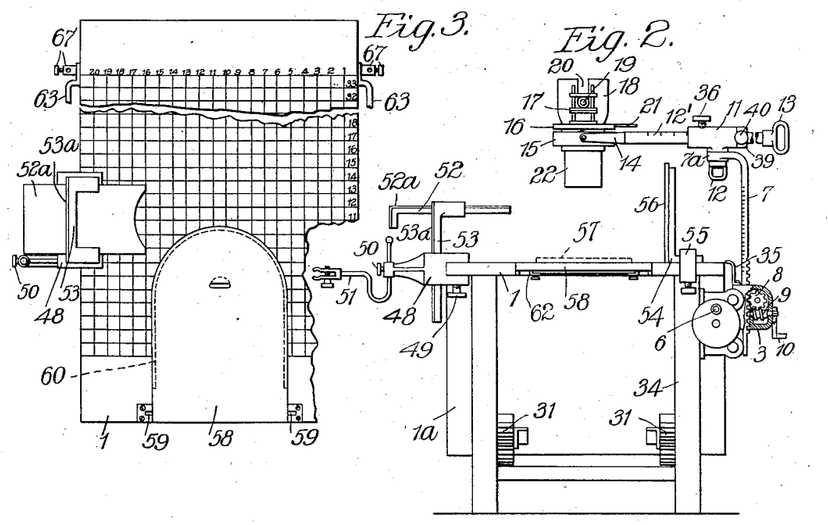
Fig. 2 is an end view taken from the left of the parts shown in Fig. 1.
Fig. 3 is a partial view of the top of the table, showing the graduations and the removable portion of the top.

Referring to Figs. 1 and 2, the table 1 has secured on one side thereof two guide-bars 2, upon which a bracket 3 is adapted to slide longitudinally of the table. The screw 4 extending longitudinally of the table is supported in bearings 5 and prevented from longitudinal motion thereby. The screw 4 coöperates with a threaded portion of the bracket 3, as a result of which rotation of the screw 4 moves the bracket 3 longitudinally upon the guides 2. The screw 4 carries at its left-hand end, as shown in Fig. 1, a hand wheel 6 adapted to rotate such screw. The bracket 3 has extending vertically from it a rack 7, coöperating with a pinion 8 carried by the bracket. The pinion 8 is adapted to be driven by a worm 9 supported by the bracket 3, which worm is adapted to be rotated by the crank 10. The rack 7 is extended horizontally at its upper end, as indicated at 7ª, and has pivoted thereto a sleeve 11, which sleeve may be secured to the horizontal portion 7ª by means of the nut 12, as a result of which the sleeve 11 may be rigidly held in any desired position upon its vertically disposed pivot. The sleeve 11 has extending therethrough a round rod 12', to the right-hand end of which, as shown in Fig. 2, a handle 13 is secured. The rod 12' supports a fork 14 at its left hand end, as shown in Fig. 2, and between the ends of this fork 14 a ring 15 is pivoted. The ring 15 is thus free to swing upon a horizontal diameter extending longitudinally of the table when the rod or arm 12' is in its normal position, and this ring 15 constitutes a support for a diaphragm receptacle 16 and X-ray tube support 17. A protecting bowl 18 is also supported from the ring 15 in such a position as to surround the X-ray tube 19 when the latter is in place in the tube support 17, slots 20 being formed in the bowl or shield 18 to permit the ready insertion and removal of the X-ray tube therefrom. The diaphragm receptacle 16 is adapted to receive any desired conformation of diaphragm 21, as indicated in Fig. 4, whether the opening be round, rectangular or irregular in conformation. A compression tube 22 is removably secured to the ring 15 by means of a bayonet joint not shown, and serves to engage the portion of the subject to be treated and prevent vibration of the same during the taking of the X-ray picture. Instead of the tube 22, the ring 15 is adapted to support, if desired, a ring 23 indicated in Figs. 10 to 13, inclusive, in which posts 24 are removably secured by screws 25 so as to extend downward from the ring 23. The posts 24 support at their lower ends a plate or sheet of material 26 transparent to X-rays, which is provided with a ring or border 27 of material opaque to X-rays, in order to limit the field of operation of such rays.

Figure 10:
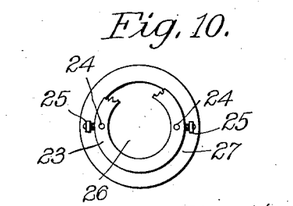
Fig. 10 is a detail top view of a modified form of compression member, consisting of a sheet or plate of material transparent to X-rays, adapted to engage the entire surface of the subject to be treated.
Figures 11, 14:
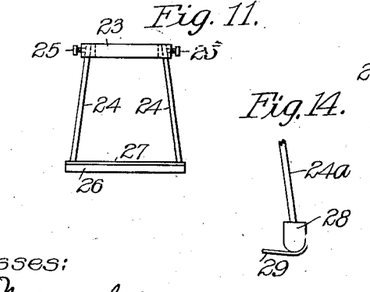
Fig. 11 is a side view of the parts shown in Fig. 10.
Fig. 14 is a partial side view of the compression member shown in Fig. 13.

The form of compression member shown in Figs. 10 and 11 is circular, and as it consists of a continuous sheet or plate of material, compression is exerted upon the entire surface of that portion of the subject which is under treatment.

Figure 12:
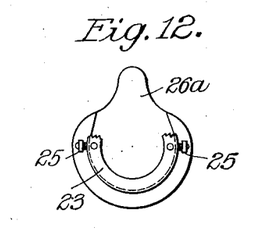
Fig. 12 is a view similar to Fig. 10, of a modified form of compression member.
Figure 13:
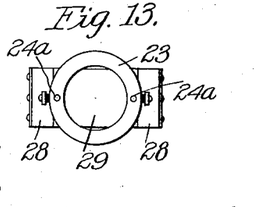
Fig. 13 is a view similar to Fig. 10, of a form of compression member adapted to engage portions of the subject to be treated that may have irregular conformation not adapted to be engaged by a plane surface or a surface of regular conformation.

In the modification shown in Fig. 12 the compression plate 26ª is irregular in shape and adapted to engage corresponding irregular portions of the subject to be treated. The compression member indicated in Figs. 13 and 14 consists of two bars 28 horizontally disposed and secured to the lower ends of the rods 24ª, and between the bars 28 a strip of flexible fabric 29 is stretched. The fabric 29 thus constitutes a yielding means for engaging irregular surfaces not adapted to be engaged by the plane surface of the compression plates 26 and 26ª.

As shown in Fig. 1, the right-hand end 1ª of the table 1 is hinged at 30 so that it may be raised or lowered as desired, and rack bars 31 are pivoted to the portion 1ª of the table at 32 to engage the pins 33 carried by the table legs 34 to retain the end portion 1ª in any desired position.

Figure 5:
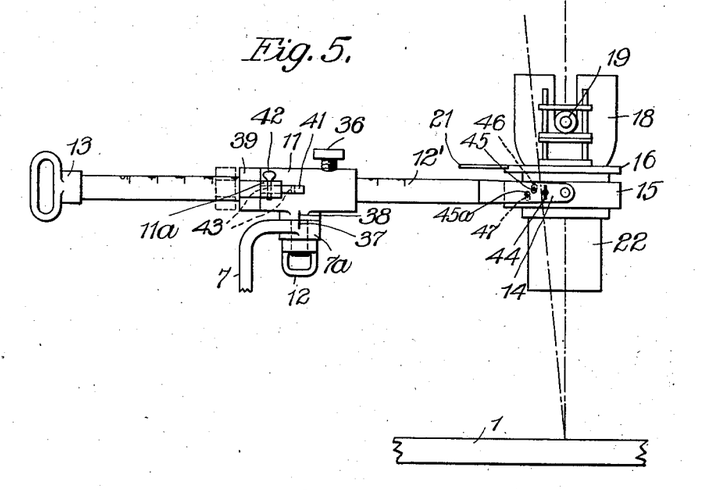
Fig. 5 is an enlarged detail view, showing the means used to support an X-ray tube over the table and to determine two positions of the tube such that the axes of the rays projected from the tube for these positions are directed at substantially the same point at or near the top of the table.

The top of the table 1 is graduated, as indicated in Fig. 3, as are also the edge of the rack 7 and the top of the rod or arm 12'. The graduations on the arm 12' afford a means for moving the tube 19 transversely of the table top to a position desired, as indicated by the numerals at the upper ends of the longitudinal graduations indicated in Fig. 3. The bracket 3 has secured to its upper surface adjacent to the edge of the table a pointer 35, which serves to indicate the position of the bracket longitudinally of the table, as a result of which the tube 19 may be readily moved longitudinally of the table to any position desired, as indicated by the numerals at the right-hand edge of the table top as shown in Fig. 3. The graduations upon the edge of the rack bar 7 afford a means for determining at once the distance of the center of the tube 19 from the top of the table. The graduations upon the rack 7 are so made and designated that this distance may be read off directly without computation. A clamping screw 36 is provided in the sleeve 11 to retain the arm 12 in any desired position. As indicated in Fig. 5, the horizontally disposed portion 7ª of the rack 7 and the sleeve 11 have formed thereon marks 37 and 38, which afford a means for moving the arm into its normal position extending at right angles across the table to place the center of the tube 19 over the transverse graduation indicated by the pointer 35. When in this position, motion of the arm 12' in the sleeve 11 moves the center of the tube 19 along the transverse graduation indicated by the pointer 35, while for any particular adjustment of the arm 12' motion of the screw 4 moves the center of the tube along the longitudinal graduation of the table indicated by the graduations on the top of the arm 12'.

Figure 6:
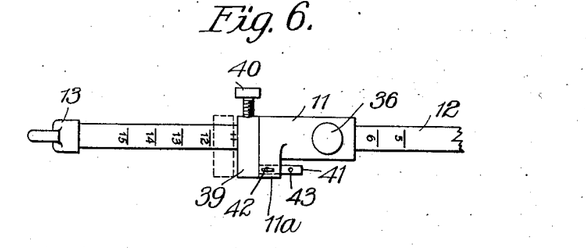
Fig. 6 is a top view of the supporting arm shown in Fig. 5.

In Figs. 5 and 6 I have shown a construction employed for producing photographic plates having stereoscopic effects which are desirable in connection with localization work for the purpose of determining the position of foreign substances in the subject treated. This result is accomplished by providing a collar 39 upon the arm 12′ between the sleeve 11 and the handle 13. This collar 39 is provided with a clamping screw 40 for engaging the arm 12′ and carries a bar 41 disposed in parallel relation to the arm 12′ outside of the sleeve 11. The arm 41 extends through a lug 11ª formed upon such sleeve 11 and is adapted to be engaged in two different positions in such lug by means of a pin 42 extending through a hole in the lug 11ª and either one of two holes 43 in such bar 41. The holes 43 in the bar 41 are spaced a distance apart equal to the average pupilary distance of the human eyes, as a result of which, if the clamping screw 36 is released and the clamping screw 40 is turned into engagement with the arm 12′, the X-ray tube may be moved transversely of the table an amount equal to the normal distance between the human eyes by moving the bar 41 in the lug 11ª so that the pin 42 first engages one and then the other of the holes 43. The ring 15 is normally held in such a position that the common axis of the bowl 18 and the tube 22 is vertically disposed, and this is accomplished by the pin 44 extending through a hole in one arm of the fork 14 into a corresponding hole in the ring 15. When it is desired to take a stereoscopic picture, the arm 12′ is moved to a position to make a first plate with the common axis of the bowl 18 and tube 22 perpendicular to the top of the table 1. Then the pin 44 is withdrawn from the hole in the fork 14 and the ring 15 with which it is normally in engagement and is placed either in the hole 45 or the hole 45ª in the fork 14, depending upon which side of the table the photograph is being made, and the ring 15 is tilted upon its pivotal support until the hole 46 or the hole 47 in the ring 15, as the case may be, is brought into line with the hole 45 or the hole 45ª, into which the pin 44 has been inserted. If the photograph is made in a position near the supporting sleeve 11, the arm 12′ is moved first to the proper position for taking a picture, with the axis of the tube 22 vertically disposed. The pin 42 is then removed from the lug 11ª after tightening the clamping screw 36, and the collar 39 is moved to a position to bring the right-hand hole 43 in line with the hole in the lug 11ª, and the pin 42 is inserted in place. The clamping screw 40 is then brought into engagement with the arm 12′, after which the clamping screw 36 is released, and a photograph is made with the axis of the tube 22 in its vertical position. Then the pin 44 is removed from the fork 14 and the ring 15 and is placed in the hole 45ª in the fork 14, after which the ring 15 is swung upon its pivotal support until the hole 47 in the ring 15 is brought into line with the hole 45ª, and the pin 44 is then placed in the alined holes. Then the pin 42 is removed from the lug 11ª, and the arm 12 is moved in the sleeve 11 until the collar 39 engages such sleeve, for which position the hole in the lug 11ª is in line with the left-hand hole 43 in the bar 41, and the pin 42 is then inserted in these alined holes. For this position of the tube 22 its axis extends through the same point at the top of the table as did its axis when in the vertical position, and a second photograph is then made. In this way the two photographs serve, when properly viewed by means of a stereoscope, to give the appearance of solidity to the image and give accurate indications of the relative depths of different opaque substances that may be in the subject treated. If it is desired to make stereoscopic photographs on the other side of the table, that is with the arm 12′ extended nearly or quite its maximum distance through the sleeve 11, the operation is similar, differing only in that the collar 39 is moved into engagement with the sleeve 11 when the axis of the tube 22 is vertically disposed, and to make the second photograph the pin 44 is placed in the holes 45 and 46, which when brought into engagement incline the axis of the tube 22 in the opposite direction from the inclination given it as above described. For taking the second photograph under these conditions, the arm 12′ is moved to the left, as shown in Figs. 5 and 6, to bring the right-hand hole 43 in the bar 41 into alinement with the hole in the lug 11ª, for which position the pin 42 is inserted into the alined holes.

The mechanism above described for use in making stereoscopic photographs is also of value in connection with localization work, in which two images may be made upon the same plate, and the depth of the opaque substance from the surface of the subject treated may be determined by calculation. This is accomplished by manipulating the apparatus as above described, the only difference being that the two exposures are made upon the same plate and then from the angle of inclination of the tube 22 for the two exposures, which angle is fixed and known, the depth of the opaque substance from the surface of the subject may be readily calculated from the distance apart of the images made upon the plate and the distance that the X-ray tube 19 is from the plate upon which the images are made. All that is necessary in localizing or determining the position of foreign matter in the subject is to know the proportions used in constructing the mechanism for the purpose indicated to enable the operator to calculate the depth of the foreign matter from the surface of the subject. For this purpose, therefore, the proportions of the apparatus may be selected as desired, although for stereoscopic work it is desirable that the transverse displacement of the tube 19 for the two photographs be equal to the average pupilary distance of the human eyes. It is, therefore, usually convenient to employ the same constants and proportions of parts for localization work.

As shown in Figs. 1 and 2, a clamp 48 is secured by means of a screw 49 to the edge of the table opposite to that along which the bracket 3 is adapted to move. The clamp 48 adjustably supports, by means of a clamping screw 50, a support 51 for an X-ray tube which may be used to project rays horizontally above the table from left to right, as indicated in Fig. 2. Suitable shields 52 and 53 are also supported from the clamp 48 in order to limit the field of the rays from the tube supported by the bracket 51. The shields 52 and 53 are preferably faced with sheet lead or similar substance opaque to X-rays, as indicated at 52$^a$ and 53$^a$. In using the tube supported by the clamp 48 a vertical supporting member 54 may be used which is adjustably secured to the table by a clamp 55 and is adapted to hold in proper position a plate-holder 56 for receiving the image produced by the tube supported by the bracket 51. In using the tube 19, the plate-holder is disposed in the position indicated at 57 on top of the table 1.

At the left-hand end of the table 1, as shown in Fig. 1, a removable leaf 58 is provided, which is pivoted to the table at 59 and is retained in its position to form a continuation of the surface of the table by engaging a rabbet 60 formed around the edge of the opening into which the leaf 58 fits. When it is desired to take a picture obliquely or horizontally by means of the tube 19, the leaf 58 may be lifted bodily out of the table, since the pivots 59 are separable from their supports, and the patient is placed in the opening formed in the table top, after which the pivots 59 are replaced in their supports and the leaf 58 is given the inclination desired, in which position it is supported by means of the braces 61, which are arranged in any convenient manner to support the leaf in any desired position. The leaf 58 carries on its under surface a plate-holder support 62 to facilitate the taking of pictures in this position. The plate-holder support 62 may also carry reducing kits, if desired, to limit the size of the picture made on the plate.

Figure 7:
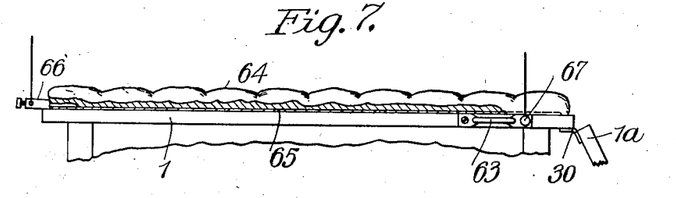
Fig. 7 is an edge view of the upper portion of the table, showing partially in section a pad thereon used for autocondensation treatment.

Metallic handles 63 are secured to the edges of the table near its right-hand end, as indicated in Fig. 1, and these serve, in conjunction with the cushion 64 shown in Fig. 7, to give treatments known as autocondensation. The cushion 64 is provided along its lower surface with a conducting plate 65 connected to a binding post 66. Each of the handles 63 is provided with a binding post 67. The patient to be treated is placed upon the cushion 64 and grasps the handles 63. The binding posts 67 are connected together and to one terminal of a source of alternating current, the other terminal of which is connected to the binding post 66. The patient is caused to be one of the elements of a condenser, the other of which is the plate 65, and thus the effect resulting from any desired condition of electrical charge may be secured.

Figure 15:
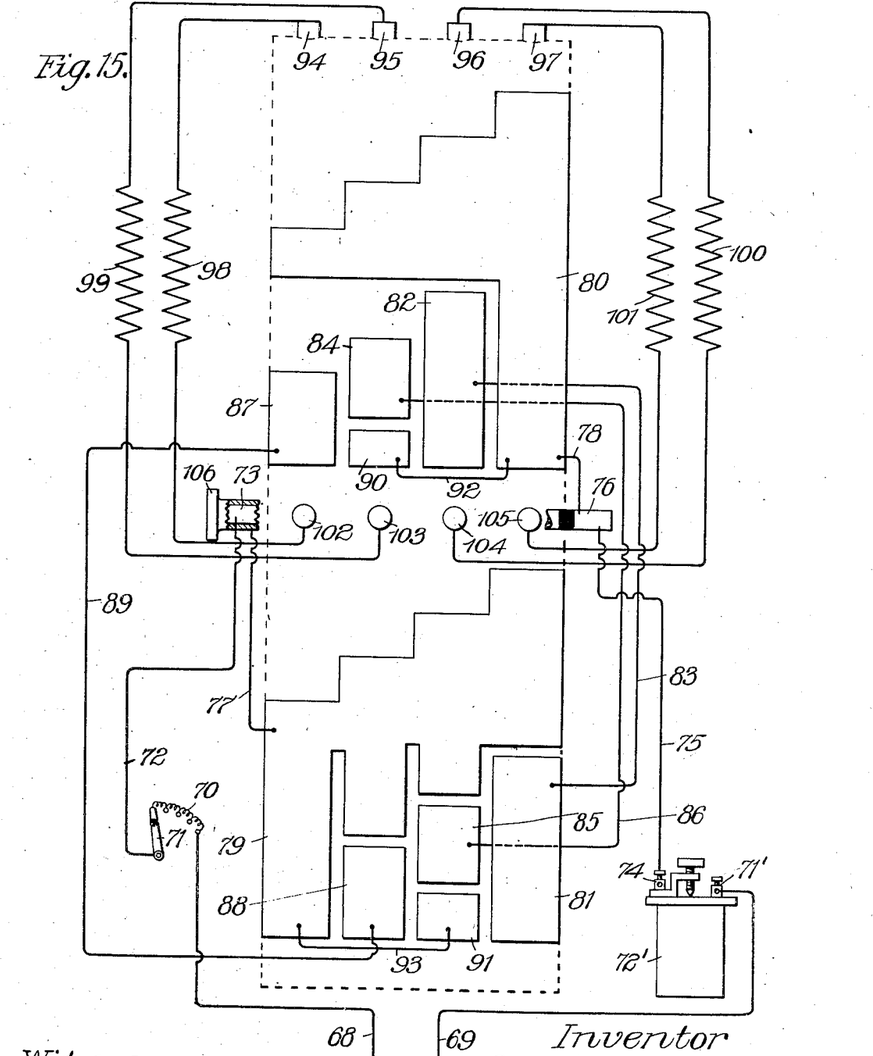
Fig. 15 is a diagrammatic view of the circular connections and switches employed in connection with operating a single X-ray tube in accordance with my system.

In operating the tube 19 to take pictures vertically through the subject, I make use of a single induction coil, the primary winding of which is connected, as indicated in Fig. 15, through an interrupter to suitable alternating current leads, while the secondary winding is connected to the terminals of the tube 19. As indicated in Fig. 15, the alternating current leads are shown at 68 and 69 and are connected, respectively, with the resistance 70 and one terminal 71' of the electrolytic interrupter 72'. The resistance 70 is adapted to be controlled so as to bring more or less of it into circuit by means of a switch arm 71, to the pivotal point of which the wire 72 is connected. The wire 72 is also connected to the left-hand end of the shaft 73 of a rotary controlling switch shown diagrammatically in this figure. The other terminal 74 of the interrupter is connected by wire 75 with the right-hand end 76 of the shaft of the rotary switch, which end is insulated from the end 73. The portions 73 and 76 of the shaft are connected by wires 77 and 78 with contact blocks 79 and 80, respectively. In addition to the contact blocks 79 and 80, the rotary member of the rotary switch carries contact blocks 81 and 82, which are connected together by wire 83, contacts 84 and 85 which are connected together by wire 86, contacts 87 and 88 which are connected together by wire 89, and contacts 90 and 91 connected, respectively, with contacts 80 and 79 by means of wires 92 and 93. The contact blocks mentioned are insulated from each other. As shown in Fig. 15, the contact blocks referred to are indicated diagrammatically in developed view, but it is to be understood that normally they form the surface of a cylinder, the axis of which is the shaft 73—76, by which the contact blocks carried by the cylinder are rotated.

Figure 16:
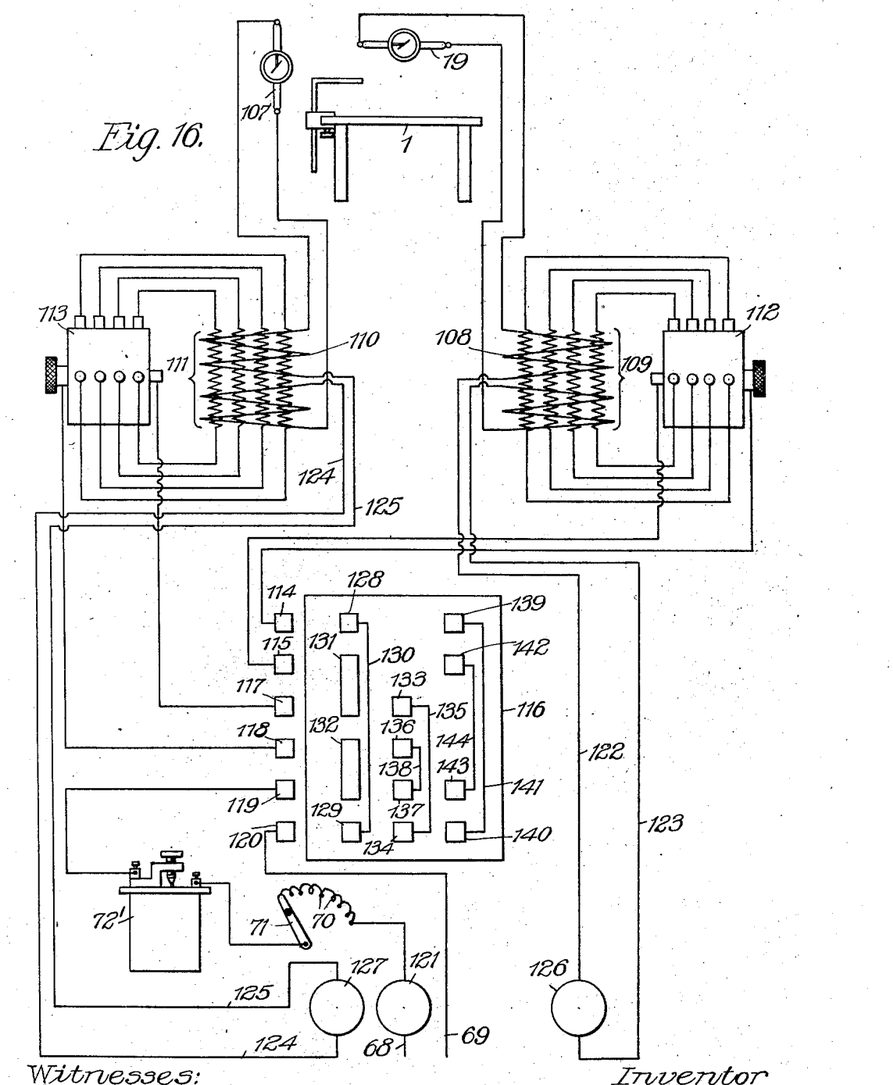
Fig. 16 is a diagrammatic circuit arrangement of the connections employed when it is desired to use two X-ray tubes singly or together.

Two sets of brushes are disposed at right angles to each other and in position to engage the contact blocks as they are rotated, each set lying in a line parallel with the axis of the cylinder. As indicated in Fig. 15, the brushes 94, 95, 96, 97, constituting one of these sets, are connected, respectively, with the sections 98, 99, 100 and 101 of the primary winding of the induction coil, the other terminals of these windings being connected, respectively, with the brushes 102, 103, 104 and 105, constituting the other set of brushes. The contact blocks are so disposed that as the cylinder is rotated by the handle 106, connection is made between the contact blocks 79 and 80 with the several brushes so as to successively bring into circuit the section 101 alone, the sections 101, 100 in parallel, the sections 101, 100 and 99 in parallel, the sections 101, 100, 99 and 98 in parallel, the sections 100 and 101 in series, the sections 99, 100 and 101 in series, the sections 98, 99, 100 and 101 in series, and the sections 98 and 99 in series, and this series arrangement in parallel with a second series arrangement through the sections 100 and 101, depending upon the position to which the cylinder is moved. The secondary winding, located in practice in inductive relation to the primary windings 98, 99, 100 and 101, is not shown, since its connection is indicated in Fig. 16, and also since the relation that it bears to the primary windings and the induction coil core is no different than that found usually in practice, with the exception of the means employed for measuring the current induced in the secondary winding, which is also indicated in Fig. 16.

Figures 8, 9:
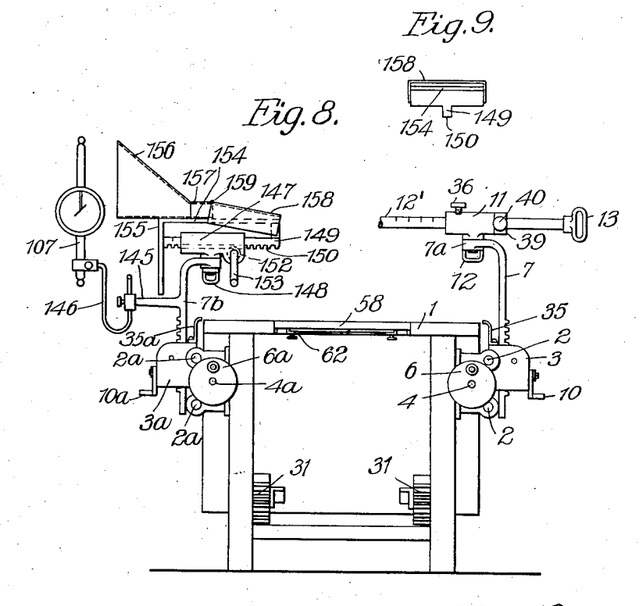
Fig. 8 shows in a view similar to Fig. 2 mechanism that may be employed to support a second X-ray tube at one side of the table to project rays horizontally above such table.
Fig. 9 is a detail end view of the adjustable restricting shield shown in Fig. 8 for engaging the subject to be treated to limit the field of application from the X-ray source.

As shown in Fig. 8, the table 1, in addition to being equipped with the mechanism shown in Figs. 1 and 2 for supporting the X-ray tube 19 over the table, is equipped with similar mechanism for supporting a second X-ray tube 107 at the side of the table. This supporting mechanism consists of guidebars 2ª, a slidable bracket 3ª, a longitudinal screw 4ª provided with an operating hand-wheel 6ª, a vertical rack 7ᵇ supported by the bracket 3ª, and an operating crank 10ª for moving the rack 7ᵇ vertically as desired. All of these parts are similar and operate similarly to the corresponding parts used to support and adjust the position of the tube 19. The position of the bracket 3ª may be readily determined by means of the indicator 35ª similar to the indicator 35 above described.

The rack 7ª is provided with a horizontally extending arm 145 adapted to adjustably support a bracket 146 for holding the X-ray tube 107 in such a position as to project its rays horizontally across the top of the table. The rack 7ᵇ is extended horizontally at its upper end and is provided with a pivotal support for the sleeve 147 similar to the support of the sleeve 11. The sleeve 147 may be secured in any desired angular adjustment by means of the clamping nut 148. The sleeve 147 supports a rod or arm 149, which is provided with a rack 159 on its lower edge for engaging the pinion 152 operated by a crank 153. The crank 153 thus serves to move the rod 149 as desired. The rod 149 supports from its ends a horizontally disposed shield 154, from the left-hand end of which a vertically disposed shield 155 depends. The shields 154 and 155 may be provided with opaque lead coverings in a manner similar to that above described for the shields 52 and 53 in connection with Fig. 2. The shield 154 carries at its rear end a hood 156 of opaque material, which terminates at its right-hand end in a rectangular tube 157, to the right-hand end of which an adjustable U-shaped member 158 is hinged. The member 158 is so formed that it constitutes the top and sides of a continuation of the tube 157, and by its motion upon its hinges 159, the right-hand end of the continuation of the tube 157 may be made of any desired depth vertically. The coöperation of the rod 149, shield 154 and adjustable member 158 is indicated in end view in Fig. 9.

By means of the mechanism described the X-ray tube 107 is readily supported in a position to direct its rays into the hood 156 and through the tube 157 and its adjustable extension, all of which are composed of opaque material to prevent the projecting of the X-rays where they are not desired. In using this apparatus the member 158 may be caused to operate as a compression member if desired, and be brought positively into engagement with the subject by means of the crank 153, in which position it may be secured by a suitable clamping screw not shown. This apparatus is adapted for operation in conjunction with the apparatus used above the compression table for the purpose of supplying a horizontal X-ray field for neutralizing the interceptive effect of normally opaque substances when acted upon by the X-ray tube 19 supported over the table in accordance with the "O'Donnell method," or the X-ray tube 107 may be used alone for the purpose of making photographs horizontally through the subject.

When it is desired to use two X-ray tubes simultaneously, as for example, in using the "O'Donnell method," or when a compression table is equipped so that either the upper tube or the side tube may be used as desired, I employ circuit connections as indicated in Fig. 16. In this figure a compression table is shown at 1 and an X-ray tube 19 is shown disposed over the table, while a second X-ray tube 107 is shown disposed at the side of the table, and while these tubes are supported and capable of adjustment in the manner already described, these supporting means are omitted in Fig. 16 for the sake of clearness. The terminals of the tube 19 are connected with the secondary winding 108 of an induction coil 109, while the tube 107 is connected to the terminals of the secondary winding 110 of an induction coil 111. Each of the induction coils 109 and 111 is provided with a primary winding consisting of four sections, as indicated and described in connection with Fig. 15, which sections are adapted to be connected, as described in connection with such figure, by means of controlling switches 112 and 113, respectively. The terminals of the switch 112 are connected with the brushes 114 and 115 of a switching mechanism 116, which is here shown diagrammatically, and is constructed in a manner similar to the switches 112 and 113. The terminals of the switch 113 are connected with the brushes 117 and 118. The conductors 68 and 69, connected with the source of electricity used to operate the induction coils, are connected with the brushes 119 and 120, and in the conductor 68 there are connected in circuit the regulating resistance 70, switch arm 71, and the electrolytic interrupter 72′. There is also connected in the conductor 68 an ammeter 121 for measuring the current supplied to the primary windings of the induction coils 109 and 111. Each of the secondary windings 108 and 110 is opened at its middle point, and these breaks are extended by conductors 122, 123, and 124, 125, respectively, to milliammeters 126 and 127 mounted upon the switchboard. By this arrangement the conductors 122, 123, 124 and 125 have impressed upon them practically no potential relatively to the rest of the electrical apparatus mounted upon the switchboard.

The movable contacts of the switch 116 are arranged to engage the brushes 114, 115, 117, 118, 119 and 120 in three positions. When moved to the first position the contacts 128 and 129, connected by wire 130, engage brushes 114 and 120, respectively. In this position the contact 131 engages the brushes 115 and 117, and the contact 132 engages the brushes 118 and 119. As a result, the primary windings of the induction coils 109 and 111 are connected in series relation for the first position of the switch 116. When this switch is moved to its second position, the contacts 133 and 134, connected by wire 135, engage the brushes 117 and 120, respectively, and the contacts 136 and 137, connected by wire 138, engage the brushes 118 and 119, respectively. For this position the primary windings of the induction coil 111 are connected in circuit alone, and for the third position of the switch 116 the contacts 139 and 140, connected by wire 141, engage the brushes 114 and 120, respectively, and the contacts 142 and 143, connected by the wire 144, engage the brushes 115 and 119, respectively. As a result of this, when the switch is in its third position, the primary windings of the induction coil 109 only are connected in circuit with the main supply wires 68 and 69. I have thus provided a means by which either one or both of the induction coils may be operated as desired from the same interrupter, and further that either induction coil may be regulated as desired so that the intensity of the field produced by the corresponding X-ray tube may be adjusted to any desired point regardless of the field produced by the other tube.

While I have thus shown and described my invention as used in connection with electrolytic interrupters, it is to be understood that any form of current interrupting device may be used that will repeatedly energize the primary winding or windings that may be used in connection with my apparatus.

While I have shown my inventon in the particular embodiment herein described, I do not, however, limit myself to this construction, but claim broadly any equivalent modification that may suggest itself to those skilled in the art.

What I claim is:

1. In a mechanism for X-ray work, the combination of a graduated table for supporting the subject, and an adjustable graduated member for supporting an X-ray tube, the graduations on the table and the graduations on such member serving to determine the position of such tube relatively to the table.

2. In a mechanism for X-ray work, the combination of a graduated table for supporting the subject, and adjustable graduated members for supporting an X-ray tube, the graduations on the table and the graduations on such members serving to determine the position of such tube relatively to the table.

3. A compression device for X-ray work consisting in the combination of a supporting member, and a second member for engaging the subject, such second member comprising a plate of material transparent to X-rays provided around its edges with a band of material opaque to X-rays.

4. A compression device for X-ray work consisting in the combination of a supporting member, plates of material transparent to X-rays, and rods for interchangeably securing them to the supporting member, such plates being of different conformation according to the work to be done.

5. A compression device for X-ray work consisting in the combination of a supporting member, plates of material transparent to X-rays, and rods for interchangeably securing them to the supporting member, such plates being of different conformation according to the work to be done and having borders of material opaque to X-rays.

6. In a mechanism for X-ray work, the combination of a table for supporting the subject, a guide supported at one of the edges of the table, an arm supported by the guide, a collar adapted to be secured to the arm, an X-ray tube support carried by such arm, and means for securing the collar to the guide in either of two positions.

7. In a mechanism for X-ray work, the combination of a table for supporting the subject, a guide supported at one of the edges of the table, an arm supported by the guide, a collar adapted to be secured to the arm, an X-ray tube support carried by such arm, means for securing the collar to the guide in either of two positions, and means for inclining the tube support relatively to the arm to direct the rays at practically the same point for the two positions of the collar.

8. In combination with a table for X-ray work, a leaf normally forming a portion of the table top, hinge connections supporting the leaf so it may be lifted clear of the table top when raised, and means for supporting such leaf in a raised position.

9. In combination with a table for X-ray work, a leaf normally forming a portion of the table top, hinge connections supporting the leaf so it may be lifted clear of the table top when raised, means for supporting such leaf in a raised position, and plate-holder supporting means on the under side of such leaf.

10. In combination with a table for X-ray work, a leaf pivoted to the table top and normally forming a portion thereof, hinge connections supporting the leaf so it may be lifted clear of the table top when raised, and a link for supporting such leaf in a raised position.

11. In combination with a table for X-ray work, a leaf pivoted to one end of the table top and normally forming a portion thereof, hinge connections supporting the leaf so it may be lifted clear of the table top when raised, plateholder supporting means on the under side of such leaf, and a link for supporting such leaf in a raised position.

12. In a mechanism for X-ray work, the combination of a table for supporting the subject, a first compression member supported above the table, and a second compression member supported at the side of the table, one of such compression members having an adjustable wall by which a desired portion of the subject may be engaged.

13. In a mechanism for X-ray work, the combination of a table for supporting the subject, a first compression member supported over the table by one edge thereof, a second compression member supported at another edge of the table, means for supporting a first X-ray tube over the table, means for supporting a second X-ray tube at the side of the table, and a tube of adjustable cross section through which the rays from one of the X-ray tubes are projected.

14. In a mechanism for X-ray work, means for supporting two X-ray tubes so that their rays are projected at practically right angles to each other, and a tube of adjustable cross-section for limiting the field produced by one of the X-ray tubes.

15. In a mechanism for X-ray work, means for supporting two X-ray tubes so that their rays are projected at practically right angles to each other, and a tube of adjustable rectangular cross-section through which the rays from one of the X-ray tubes are projected.

16. In a mechanism for X-ray work, the combination of a table for supporting the subject, a support for an X-ray tube, and a tube of adjustable rectangular cross-section through which the rays from the X-ray tube are projected.

17. As a means for limiting the field projected from an X-ray source, a tube comprising opaque walls one of which is adjustable relatively to the remaining walls of the tube.

18. As a means for limiting the field projected from an X-ray source, a rectangular tube comprising a plurality of opaque walls one of which is hinged to the remaining portion of the tube to change the effective cross-section of the tube.

In witness whereof, I hereunto subscribe my name this 3rd day of September A. D. 1909.

SAMUEL T. HUTTON.

Witnesses:
 ALBERT C. BELL,
 LEONARD E. BOGUE.